(12) United States Patent  
Cler et al.

(10) Patent No.: US 11,643,794 B2
(45) Date of Patent: May 9, 2023

(54) SYSTEM AND METHOD FOR MONITORING A MACHINE OPERATING AT A WORKSITE

(71) Applicant: Caterpillar Inc., Peoria, IL (US)

(72) Inventors: Eric Cler, Oswego, IL (US); Aaron Robert Shatters, Montgomery, IL (US); Huzefa S Gulamhusein, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 271 days.

(21) Appl. No.: 17/067,877

(22) Filed: Oct. 12, 2020

(65) Prior Publication Data

US 2022/0112691 A1 Apr. 14, 2022

(51) Int. Cl.
*E02F 9/26* (2006.01)
*G05D 1/00* (2006.01)
*B60K 35/00* (2006.01)
*E02F 3/28* (2006.01)
*G07C 3/02* (2006.01)
*G01C 22/00* (2006.01)
*E02F 9/20* (2006.01)

(52) U.S. Cl.
CPC ............... *E02F 9/26* (2013.01); *B60K 35/00* (2013.01); *E02F 3/283* (2013.01); *E02F 9/2004* (2013.01); *G01C 22/00* (2013.01); *G05D 1/0094* (2013.01); *G07C 3/02* (2013.01); *B60K 2370/167* (2019.05); *B60K 2370/178* (2019.05); *G05D 2201/0202* (2013.01)

(58) Field of Classification Search
CPC . E02F 9/26; E02F 3/283; E02F 9/2004; E02F 3/439; E02F 3/434; B60K 35/00; B60K 2370/167; B60K 2370/178; B60K 2370/152; B60K 2370/168; G01C 22/00; G05D 1/0094; G05D 2201/0202; G07C 3/02

See application file for complete search history.

(56) References Cited

U.S. PATENT DOCUMENTS 5,265,705 A 11/1993 Takasugi et al.
5,422,466 A 6/1995 Saitoh et al.
(Continued)

FOREIGN PATENT DOCUMENTS

GB 2072906 A 10/1981

*Primary Examiner* — James M McPherson
*Assistant Examiner* — Kyle J Kingsland

(57) ABSTRACT

A method for monitoring a machine operating at a worksite, is provided. The machine includes an implement for performing one or more implement operations and is configured to be propelled by a set of ground engaging members between a first location and second location. A first input indicative of start of a travelling operation of the machine after completion of a first implement operation at the first location, is received. One or more transmission parameters associated with the machine are determined, when the machine moves from first location to second location. A second input indicative of end of the travelling operation at start of a second implement operation at the second location is received. A number of revolutions completed by ground engaging members between the first location and the second location is determined based on the transmission parameters. The number of revolutions is displayed on input/output device associated with machine.

20 Claims, 5 Drawing Sheets

(56) References Cited

U.S. PATENT DOCUMENTS

| | | |
|---|---|---|
| 6,539,294 B1 | 3/2003 | Kageyama |
| 7,894,961 B2 * | 2/2011 | Blackburn ............. G07C 5/085 377/28 |
| 10,228,232 B2 * | 3/2019 | Friend .................... G01C 21/20 |
| 2016/0060847 A1 * | 3/2016 | Roach ..................... E02F 3/434 701/50 |

* cited by examiner

SYSTEM AND METHOD FOR MONITORING A MACHINE OPERATING AT A WORKSITE

TECHNICAL FIELD

The present disclosure relates, in general, to a machine operating at a worksite. More particularly, the present disclosure relates to a system and method of monitoring the machine operating at the worksite.

BACKGROUND

Many work machines may be used to perform a number of operations in repeated manner to accomplish a particular task at a worksite. One example of such machines is a wheel loader that performs a number of loading and digging cycles at the worksite, where the wheel loader repeatedly moves between a pile of work material to dig the material and a truck to load the material thereon. Generally, the truck is required to be parked at an optimum distance from the pile of work material, so that the travel distance for the wheel loader is minimized and the loading can be completed efficiently and in lesser time.

Generally, determining and maintaining this optimum travel distance between the pile of work material and the truck is based on an operator's estimation and observation. There is no way for the operator to know or to determine if they are exceeding this optimal distance and operating the wheel loader inefficiently. Thus, such manual operations of the machine may be prone to errors and hence not desirable.

GB Patent No. 2072906 provides a device for indicating a distance covered by a vehicle. The device includes a mechanical counter connected to a vehicle component, such as a shaft in a gear box, which rotates in accordance with the distance covered. The counter includes a number of interconnected counter wheels to produce a decimal total, means for scanning or sensing the instantaneous positions of the counter wheels, a converter which receives the scanned data and converts it to digital output signals, and a digital indicator electrically connected to the converter.

SUMMARY OF THE INVENTION

In one aspect, a method for monitoring a machine operating at a worksite, is provided. The machine includes an implement for performing one or more implement operations. The machine is configured to be propelled by a set of ground engaging members at the worksite between a first location and a second location. The method includes receiving, by a controller, a first input indicative of start of a travelling operation of the machine after completion of a first implement operation of the implement at the first location. Further, one or more transmission parameters associated with the machine, when the machine moves from first location to second location, are determined by the controller. The method further includes receiving, by the controller, a second input indicative of end of the travelling operation at start of a second implement operation of the implement at the second location. The method also includes determining, by the controller, a number of revolutions completed by the ground engaging members between start of the travelling operation at the first location and end of the travelling operation at the second location based on the determined one or more transmission parameters. Furthermore, the determined number of revolutions is displayed on an input/output device associated with the machine.

In another aspect, a system for monitoring a machine operating at a worksite, is provided. The machine includes an implement for performing one or more implement operations and is configured to be propelled by a set of ground engaging members at the worksite between a first location and a second location. The system includes an input/output device, one or more implement sensors, one or more machine sensors and a controller operatively connected to the input/output device, the one or more implement sensors and the one or more machine sensors. The controller is configured to receive, from one or more of the input/output device and the one or more implement sensors, a first input indicative of start of a travelling operation of the machine after completion of a first implement operation of the implement at the first location. The controller further determines, using the one or more machine sensors, one or more transmission parameter associated with the machine when the machine moves from the first location to the second location corresponding to the received first input. Further, the controller is configured to receive, from one or more of the input/output device and the one or more implement sensors, a second input indicative of end of the travelling operation at start of a second implement operation of the implement at the second location. Furthermore, the controller is configured to determine a number of revolutions completed by the set of ground engaging members between the start of the travelling operation at the first location and the end of the travelling operation at the second location based on the determined one or more transmission parameters. The controller is further configured to display the determined number of revolutions completed by the set of ground engaging members on the input/output device.

In yet another aspect, a machine is provided. The machine is configured to operate at a worksite between a digging location and a unloading location. The machine includes an implement, a set of ground engaging members, and a system for monitoring the machine. The implement is configured to perform one or more implement operations at the worksite. The set of ground engaging members are configured to propel the machine between the digging location and the unloading location. The system includes an input/output device, one or more implement sensors, one or more machine sensors and a controller operatively connected to the input/output device, the one or more implement sensors and the one or more machine sensors. The controller is configured to receive, from one or more of the input/output device and the one or more implement sensors, a first input indicative of start of a travelling operation after completion of a digging operation of the implement at the digging location. The controller further determines, using the one or more machine sensors, one or more transmission parameter associated with the machine when the machine moves from the digging location to the unloading location corresponding to the received first input. Further, the controller is configured to receive, from one or more of the input/output device and the one or more implement sensors, a second input indicative of end of the travelling operation at start of an unloading operation of the implement at the unloading location. Furthermore, the controller is configured to determine a distance travelled by the machine between the start of the travelling operation at the digging location and the end of the travelling operation at the unloading location based on the determined one or more transmission parameters. The controller is further configured to display the determined number of revolutions completed by the set of ground engaging members on the input/output device.

DETAILED DESCRIPTION

Figure 1:
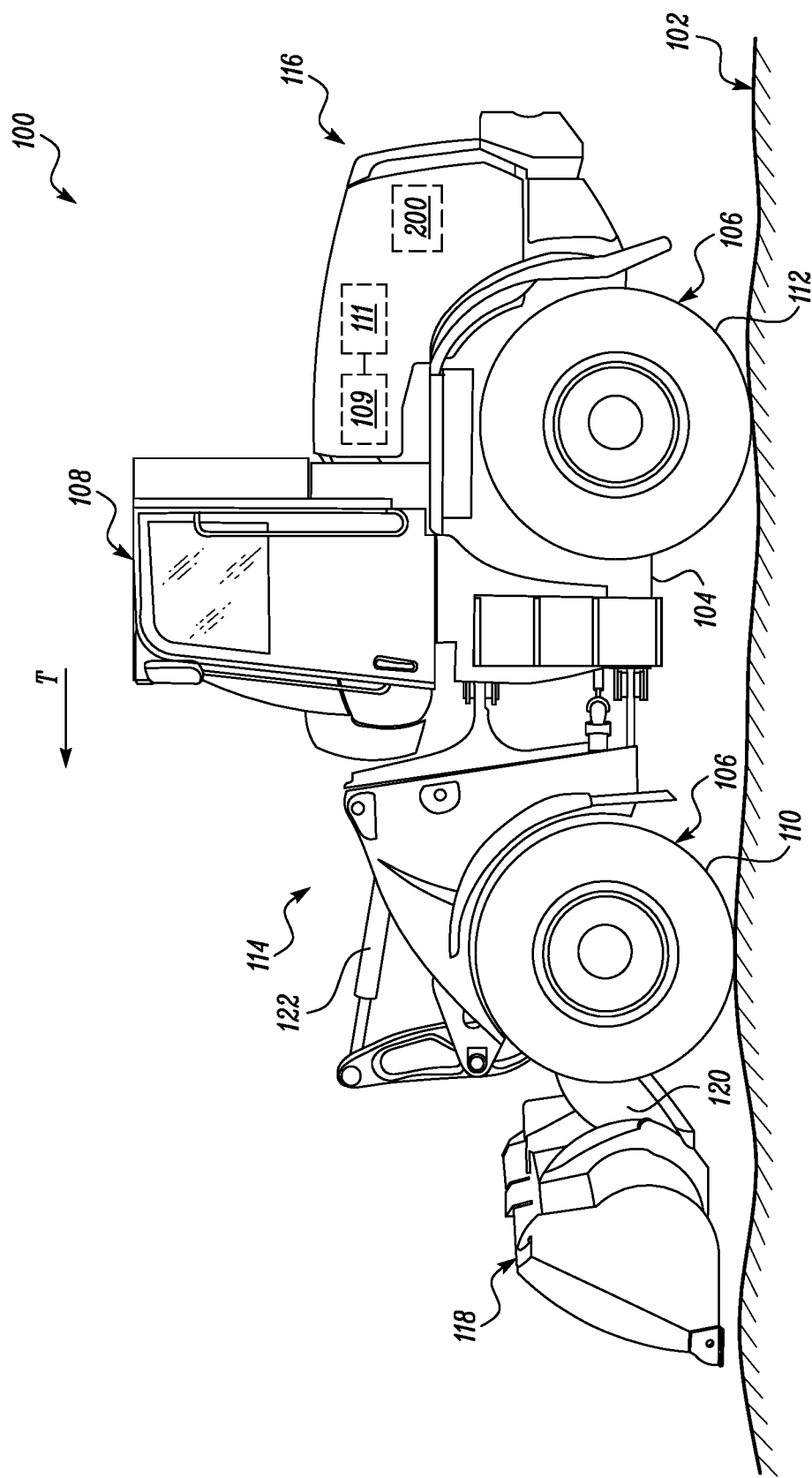
FIG. 1 illustrates an exemplary machine, according to the embodiments of the present disclosure.

The present disclosure relates to a system and method for monitoring a machine operating at a worksite. To this end, FIG. 1 illustrates an exemplary machine 100 operating at a worksite 102, in accordance with the various embodiments of the present disclosure. The worksite 102 may include a mine site, a landfill, a quarry, a construction site, or any other type of worksite. In an embodiment of the present disclosure, the machine 100 is a wheel loader. However, it may be contemplated that the machine 100 may be any type of machine configured to perform some type of operation associated with an industry such as mining, construction, farming, transportation, or any other industry. Other examples of the machine 100 may include, but not limited to, an off-highway truck, a dump truck, an excavator, or the like. Further, the machine 100 may be a manned machine or an unmanned machine. In some embodiments, the machine 100 may be a machine having a various level of autonomy, such as fully-autonomous machine, a semi-autonomous machine, or a remotely operated machine.

As shown in FIG. 1, the machine 100 includes a frame 104 that supports various components of the machine 100, such as a set of ground engaging members 106 and an operator cabin 108. In an exemplary embodiment, the ground engaging members 106, as shown in FIG. 1, include a pair of front wheels 110 and a pair of rear wheels 112 (only one side shown in FIG. 1). However, in other exemplary embodiments, the ground engaging members 106 may include endless tracks for maneuvering the machine 100 at the worksite 102. The movement of the ground engaging members 106 may be powered by a power source, such as an engine 109 via a transmission 111. In the illustrated example, the engine 109 may be housed within an engine compartment (not shown) positioned towards a rear end 116 of the machine 100. Further, the engine 109 may be based on one of the commonly applied power generation units, such as an internal combustion engine (ICE) having a V-type configuration, inline configuration, or an engine with different configurations, as are conventionally known. However, aspects of the present disclosure need not be limited to a particular type of power source.

The frame 104 defines a front end 114 and a rear end 116 of the machine 100. The terms 'front' and 'rear', as used herein, are in relation to a direction of travel of the machine 100, as represented by arrow, T, in FIG. 1, with said direction of travel being exemplarily defined from the rear end 116 towards the front end 114. The front end 114 is supported on the front wheels 110 and supports an implement 118, which performs one or more implement operations at the worksite 102. In one example, the implement 118 may be embodied as a bucket. However, it may be contemplated that in other embodiments of the present disclosure, other types of implements, such as, but not limited to, dump body, ejector body, blades, scrapers, grapples, or the like may also be employed by the machine 100. Further, examples of one or more implement operations may include, but not limited to, loading or pickup operation (such as digging operation in the present embodiment) and unloading operation (such as dumping operation in the present embodiment). Additionally, the position of the implement 118 being at the front end 114 of the machine 100 is exemplary and other positions of the implement 118 may also be contemplated without limiting the scope of the claimed subject matter.

The machine 100 may further include a pair of lift arms 120 that are movably coupled to the frame 104 at the front end 114. The implement 118 is pivotally connected to one end of the lift arms 120 by any suitable coupling mechanism (not shown), such as coupler, pin, latches, or any other mechanism generally known in the art. The machine 100 further includes one or more lift cylinders 122 that couple the lift arms 120 to the frame 104. The lift cylinders 122 are extended or retracted to raise or lower the lift arms 120.

The operator cabin 108 may include an operator console (not shown), that may include various input-output controls for operating the machine 100 and the implement 118. For example, the operator console may include, but not limited to, one or more of steering wheel, touch screens, display devices, joysticks, switches etc., to facilitate an operator in operating the machine 100 and one or more components of the machine 100, such as the implement 118. In one example, the operator console may be provided on board the machine 100, while in other embodiments, the operator console may also be positioned remotely with respect to the machine 100 and/or the worksite 102.

In an embodiment of the present disclosure, the machine 100 further includes a system 200 for monitoring the machine 100 when it operates at the worksite 102. The detailed explanation of the system 200 and its various components and functionalities will now be described in conjunction to FIGS. 2 through 4.

Figure 2:
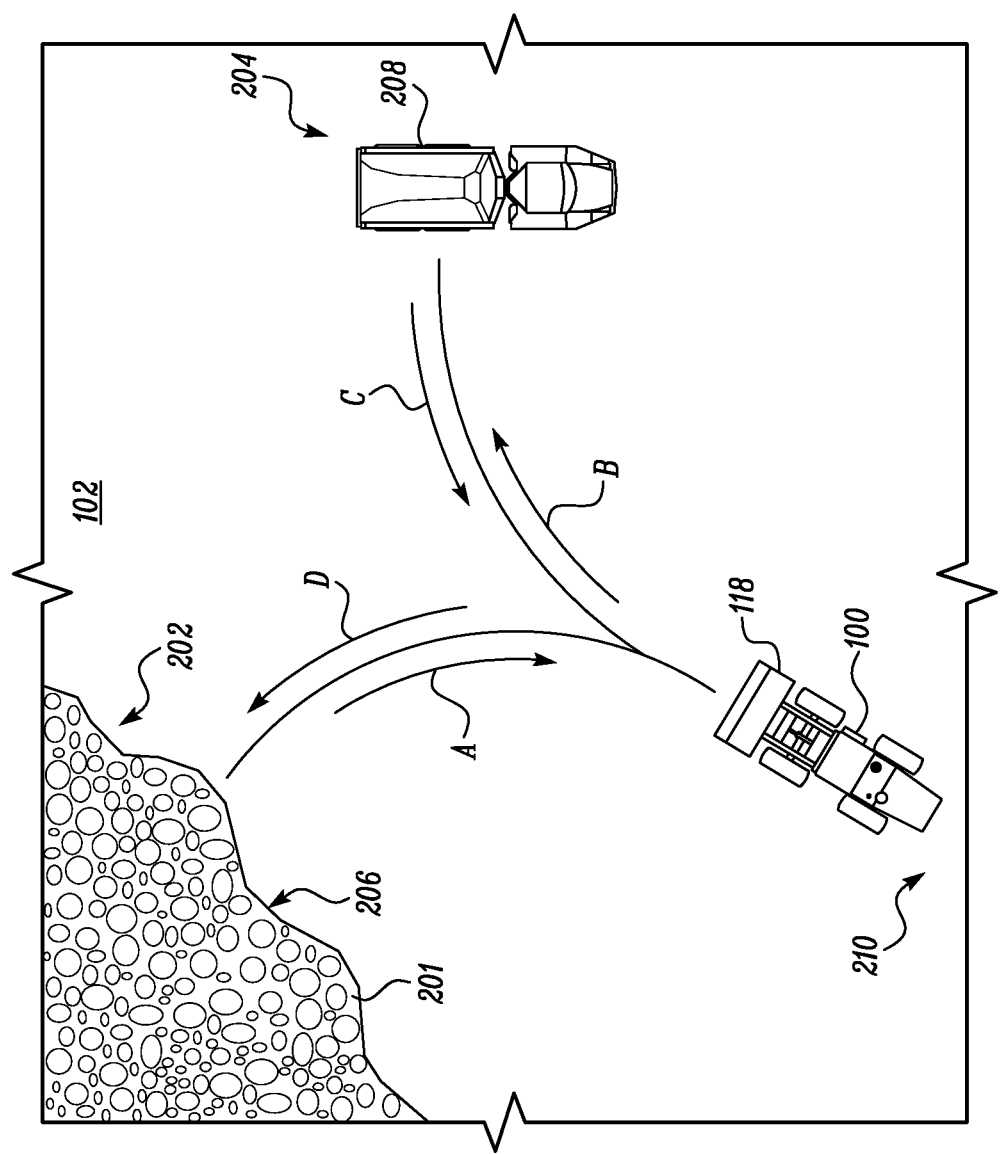
FIG. 2 illustrates an exemplary worksite having the machine configured to move between a first location and a second location of the worksite, according to the embodiments of the present disclosure.

The machine 100 may be configured to repeatedly travel between two locations to repeatedly perform one or more implement operations at the worksite 102. For example, as shown in FIG. 2, the machine 100 is configured to perform repeated travelling operations between a first location 202, such as a loading or digging location (hereinafter referred to as the digging location 202) and a second location 204, such as an unloading or dumping location (hereinafter referred to as the unloading location 204). For example, the implement 118 may be configured to perform a first implement operation, such as digging operation, for digging the work material 201 from a pile 206 of work material 201 at the digging location 202. Similarly, the implement 118 may be configured to perform a second implement operation, such as unloading operation for unloading or dumping the dug work material 201 on to a truck 208 positioned at the unloading location 204. The machine 100 may be required to repeatedly perform these operations and hence repeatedly travel between the digging location 202 and the unloading location 204 until the entire pile 206 of work material 201 is transferred to the unloading location 204.

Once the machine 100 completes the first implement operation, i.e., the digging operation at the digging location 202, the machine 100 starts a travel operation to move from the digging location 202 to an intermediate location 210, in a first direction as shown by arrow A, and from the intermediate location 210 to the unloading location 204, in a second direction as shown by arrow B. The movement of the machine 100 along the directions A and B may indicate a travel operation performed by the machine 100. Further, once the machine 100 reaches the unloading location 204, the travelling operation ends and the second implement operation, i.e., the unloading operation starts where the work material 201 is unloaded or dumped from the implement 118 onto the truck 208 at the unloading location 204. Once the second implement operation ends, the travel operation starts again and the machine 100 travels back to the digging location 202 to refill and repeat the digging operation and the unloading operation. Thus, the machine 100 travels back from the unloading location 204 to the intermediate location 210 in a third direction as shown by arrow C and subsequently from the intermediate location 210 to the digging location 202 in a fourth direction as shown by arrow D. The movement of the machine 100 along the directions C and D may indicate another travel operation performed by the machine 100. Once the machine 100 reaches back to the pile 206, the entire digging operation, travelling operation and unloading operation is repeated until the entire pile 206 is transferred on to the truck 208 at the unloading location 204. Although a truck is shown and described to be positioned at the unloading location 204 on to which the machine 100 unloads the work material 201, it may be contemplated that the machine 100 may also be configured to transfer the work material 201 to any other machine or area that may act as the unloading location 204. It may further be contemplated that FIG. 2 illustrates an exemplary pattern of travel operation performed by the machine 100 for the purposes of explanation only and that any other pattern of travel may also be envisioned without deviating from the scope of the claimed subject matter.

In order to efficiently perform the entire loading and unloading task (comprising multiple rounds of the digging operation, the unloading operation and the travelling operation), the truck 208 is required to be positioned at an optimum distance from the pile 206 of work material 201, so that the machine 100 is able to travel between the digging location 202 and the unloading location 204 efficiently. In an exemplary embodiment, such optimum distance may be defined in terms of number of revolutions to be completed by the set of ground engaging members 106. Accordingly, the system 200 is configured to monitor such number of wheel revolutions completed between the digging location 202 and the unloading location 204 and/or vice-versa, to facilitate the operator of the machine 100 in maintaining the optimum distance between the digging location 202 and the unloading location 204, and accordingly ensure that the truck 208 is positioned at an optimum number of wheel revolutions away from the pile 206. In an alternative embodiment, the system 200 may also be configured to monitor a total number of wheel revolutions completed by the wheels 110, 112 of the machine 100 from the digging location 202 to the unloading location 204 and then back to the digging location 202. In some alternative embodiments, the optimum distance may be defined in terms of machine lengths, or as distance itself in meters, miles and so on.

Figure 3:
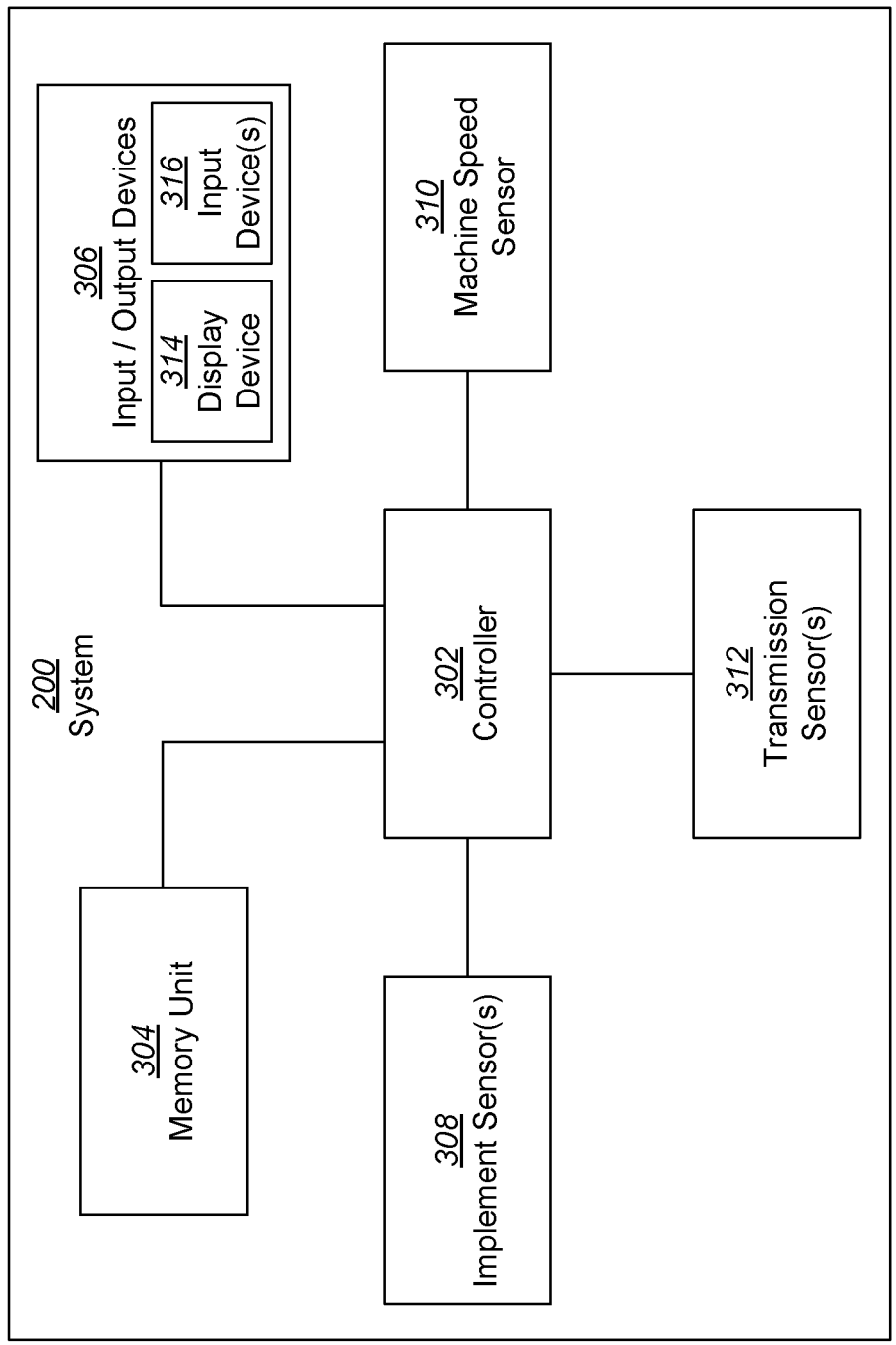
FIG. 3 illustrates an exemplary system for monitoring the machine operating at the worksite, according to the embodiments of the present disclosure.

As shown in FIG. 3, the system 200 may include a controller 302, a memory unit 304, input/output (I/O) devices 306, one or more implement sensors 308, and one or more machine sensors, such as a machine speed sensor 310 and a transmission sensor 312. The controller 302 is communicably coupled to the memory unit 304, the I/O devices 306 and the sensors 308, 310, and 312. It may be contemplated that the system 200 may include additional or fewer elements that are not described herein for the sake of brevity of the present disclosure.

The controller 302 is configured to execute instructions stored in the memory unit 304 to perform one or more predetermined operations associated with the machine 100 and its components (for example, monitoring and controlling the operations of the machine 100). The controller 302 may be implemented using one or more controller technologies, such as Application Specific Integrated Circuit (ASIC), Reduced Instruction Set Computing (RISC) technology, Complex Instruction Set Computing (CISC) technology, etc. In one example, the controller 302 may be implemented as an Electronic Control Module (ECM) of the machine 100. The memory unit 304 is configured to store a set of instructions that are executable by the controller 302 to perform the one or more predetermined operations. The memory unit 304 may include, but are not limited to, a Random-Access Memory (RAM), a Read Only Memory (ROM), a Hard Disk Drive (HDD), and a Secure Digital (SD) card.

The I/O devices 306 may be configured to receive one or more user inputs from and provide output to the operator of the machine 100. For example, the I/O devices 306 may be positioned inside the operator cabin 108 onboard the machine 100. Alternatively, the I/O devices 306 may be located remotely with respect to the machine 100 and the worksite 102. The I/O devices 306 may include one or more input devices 316 such as steering wheel, touch screens, joysticks, switches etc., that facilitate receiving one or more inputs from the operator for operating the machine 100 and its components. Further, the I/O devices 306 may be configured to provide output to the operator in the form of audio, video, textual and/or any other form of output based on instructions received from the controller 302. In an exemplary embodiment, the I/O devices 306 may include a display device 314 that may be positioned within the operator cabin 108 of the machine 100, to facilitate providing visual output to the operator of the machine 100. Alternatively, or additionally, the I/O devices 306 may include an audio output device, a textual output device, or the like positioned within the operator cabin 108.

The one or more implement sensors 308 may be mounted on the implement 118 (i.e., the bucket). Additionally, one or more implement sensors 308 may also be positioned on the lift arms 120 and the lift cylinders 122. The one or more implement sensors 308 may be configured to monitor one or more implement parameters associated with the implement 118 and its operations. Each of the one or more implement sensors 308 may be configured to generate and transmit a signal to the controller 302 including the sensed one or more implement parameters. For example, the one or more implement parameters may include one or more of a bucket tilt angle, position of the lift arms 120 (such as whether they are raised or lowered), weight of the work material inside the implement 118, etc. The one or more implement parameters may indicate the operational position of the implement 118 as the implement 118 performs the one or more implement operations, such as the digging operation and/or the unloading operation at the worksite 102. For example, the one or more implement parameters may indicate that the implement 118 is in a raised position and/or whether the bucket holds weight of the dug work material 201 or not as the machine 100 moves from the digging location 202 towards the unloading location 204 and/or vice-versa. Similarly, the implement parameters may indicate that the implement 118 is tilted as it digs the work material 201 from the pile 206 and/or unloads the work material 201 onto the truck 208. Examples of the implement sensors 308 may include, but not limited to, an accelerometer, a gyroscope, a LIDAR (Light Detection and Ranging) sensor, a radar sensor, a perception sensor, a camera sensor, a cylinder position sensor or the like.

The machine speed sensor 310 and the transmission sensor 312 may be configured to detect one or more transmission parameters associated with the machine 100 as the machine 100 operates in response to operator inputs received via the I/O devices 306 and the transmission controls (not shown) positioned within the operator cabin 108 of the machine 100. For example, the machine speed sensor 310 may be associated with the set of ground engaging members 106 and the transmission 111 and may be configured to detect a first transmission parameter, such as a machine speed at which the machine 100 moves. The machine speed sensor 310 may be configured to provide the machine speed data to the controller 302 indicative of the speed with which the machine 100 moves at the worksite 102. Examples of the machine speed sensor 310 may include, but not limited to, tachometer, magnetic pickup or optical sensor or the like. Further, the transmission sensor 312 may be associated with the transmission 111 and configured to sense a second transmission parameter, such as a gear position of the transmission 111 indicating a transmission gear selection with which the machine 100 is operating. For example, the transmission sensor 312 may be a gear position sensor positioned on a transmission selection shaft or steering column mounting (not shown) and configured to send a signal to the controller 132 indicating a current position of the transmission gear or the transmission mode (drive, reverse, parking brake, neutral) in which the machine 100 is operating.

In operation, the controller 302 may be configured to receive a first input indicative of start of a travelling operation of the machine 100 after completion of a first implement operation of the implement 118 at a first location. In one implementation, the first location is the digging location 202, the first implement operation is the digging operation, and the travelling operation may be indicated by arrows A and B in FIG. 2 to be performed by the machine 100. In other implementation, the first location may be the unloading location 204 and the first implement operation may be the unloading operation and the travelling operation may be indicated by arrows C and D in FIG. 2 to be performed by the machine 100.

For example, the controller 302 may be configured to receive the first input from an operator via the I/O devices 306, indicating start of a travelling operation to be performed by the machine 100 at the first location, i.e., the digging location 202. That means, after the first implement operation (i.e., the digging operation) is completed at the digging location 202, the operator may start the travelling operation, such as by selecting a drive or reverse gear or by selecting appropriate option through a switch/actuator or a touch screen or through any other suitable input devices provided in the operator console within the operator cabin 108. Alternatively, or additionally, the controller 302 may also receive the first input from the implement sensors 308 that indicate the position of the implement 118 and thus the status of the implement operation performed by the implement 118. For instance, once the implement sensors 308 indicate that the implement 118 has completed the digging operation (such as when the implement 118 is in a fully raised position and holds weight of the work material 201 therein), the controller 302 may be configured to detect that the first implement operation is completed and the travelling operation is started or is about to start. Similarly, in an alternative embodiment, the operator may indicate completion of the unloading operation at the unloading location 204 and start of the travelling operation via the I/O devices 306. Additionally, when the implement sensors 308 may indicate completion of the unloading operation at the unloading location 204 (such as when the implement 118 is in a lowered position and does not hold any weight therein), the controller 302 may be configured to detect start of the travelling operation to be performed by the machine 100.

The controller 302 is further configured to determine the one or more transmission parameters associated with the machine 100 as the machine 100 moves from the first location, such as the digging location 202 towards the second location, such as the unloading location 204 after receiving the first input. For example, the machine speed sensor 310 may provide the first transmission parameter, i.e., the machine speed to the controller 302. The controller 302 may be configured to determine that the machine 100 has started moving when the machine speed is detected to be either less than zero or greater than zero. That means, when the machine 100 starts moving backwards or in reverse mode, the machine speed is detected to be less than zero, whereas, when the machine 100 moves forward, then the machine speed is detected to be greater than zero. For example, the transmission sensor 312 may be configured to provide the second transmission parameter, i.e., the transmission gear position to the controller 302. That means, once the machine 100 starts the travelling operation, the controller 302 may be configured to detect that the machine 100 started moving either in a reverse direction or a forward direction based on the transmission gear selection.

Further, the controller 302 is configured to receive a second input indicative of end of the travelling operation at start of a second implement operation of the implement 118 at a second location. For example, the controller 302 may be configured to receive a second input indicating that the unloading operation is started at the unloading location 204 and the machine 100 has stopped moving. In an alternative example, the controller 302 is configured to receive a second input indicating that the travelling operation has ended at the digging location 202 when the machine 100 moves back from the unloading location 204 to the digging location 202 to repeat the digging and the unloading operations. In this case, the second input may also indicate that the machine 100 has reached the digging location 202 and the digging operation of the implement 118 is started. The second input may be received from the operator via the I/O devices 306 and/or from the implement sensors 308, in a similar manner, as described above for the first input.

Further, the controller 302 is configured to determine a distance travelled by the machine 100 between the start of the travelling operation at the first location (such as the digging location 202) and the end of the travelling operation at the second location (such as at the unloading location 204). The controller 302 may be configured to determine the distance $D_T$ travelled by the machine 100 based on the determined transmission parameters, such as the machine speed and the transmission gear. For example, the controller 302 is configured to determine the distance $D_T$ as a product of the machine speed and a time taken by the machine 100 to travel from the first location to the second location. In an embodiment, such as the one illustrated in FIG. 2, the controller 302 may be configured to determine a total of a first distance D1 and a second distance D2 travelled by the machine 100 between the first location and the second location via the intermediate location. For instance, the first distance D1 corresponds to the distance travelled by the machine 100 between the first location (i.e., one of the digging location 202 or the unloading location 204) and the intermediate location 210, when the machine speed indicates speed less than zero (reverse moving speed) and/or the transmission gear selection is determined to be reverse transmission gear. Further, the second distance D2 corresponds to a distance travelled by the machine 100 between the intermediate location 210 and the second location (i.e., the other one of the digging location 202 or the unloading location 204) when the machine speed indicates speed greater than zero (forward moving speed) and/or the transmission gear selection is determined to be drive gear. Although the present disclosure is described with reference to using both machine speed and the transmission gear for determining the distance, it may be contemplated by a person skilled in the art that in some embodiment, the distance may also be determined in any other manner using only one of the machine speed and/or the transmission gear. For example, in one alternative embodiment, the controller 302 may use only the transmission gear selection and additionally use GPS position data of the machine 100 to determine the distance travelled by the machine 100. It may further be contemplated that the pattern of movement of the machine 100 in between the first location and the second location via the intermediate location is merely exemplary and that any other pattern of movement may also be implemented and the controller 302 may be configured to determine the distance of travel corresponding to that pattern of movement.

In an embodiment of the present disclosure, the controller 302 is configured to determine a number of revolutions completed by the set of ground engaging members 106, i.e., the wheels 110, 112 in the entire travelling operation, i.e., between the first location and the second location. In one implementation, the number of revolutions may be determined based on the determined distance $D_T$ travelled by the machine 100 between the first location 202 and the second location 204. For example, the controller 302 may receive a predefined dimension, such as a diameter or radius or circumference of the wheels 110, 112 of the machine 100. Such dimension information about the ground engaging members 106 may be predefined in the controller 302 or the controller 302 may extract such information from a database by communicating with it over a network (not shown). The controller 302 may determine the number of revolutions based on the distance and the dimension of the wheels 110, 112. For instance, the number of revolutions completed by each of the wheels 110, 112 of the machine 100 may be determined according to the following equation:

No. of Rev.=Distance travelled/Circumference of the wheel($2\pi R$), where R is the radius of the wheels 110, 112.

It may be contemplated that any other mechanism for determining the number of wheel revolutions can also be used without deviating from the scope of the claimed subject matter. For example, in some other embodiments, the controller 302 may use inputs from sensors (not shown) mounted on the wheels 110, 112 to determine the number of revolutions completed by the wheels 110, 112 between the first location (i.e., one of the digging location 202 or the unloading location 204) and the second location (i.e., the other one of the digging location 202 or the unloading location 204) and vice-versa without determining the distance travelled by the machine 100.

In the illustrated embodiment of FIG. 2, the controller 302 may be configured to determine a total of a first number of revolutions and a second number of revolutions completed by the wheels 110, 112. The first number of wheel revolutions may correspond to a number of wheel revolutions completed by the wheels 110, 112 when the machine 100 travels from the first location (i.e., one of the digging location 202 or the unloading location 204) to the intermediate location 210, in reverse mode. Similarly, the second number of wheel revolutions may correspond to a number of wheel revolutions completed by the wheels 110, 112 when the machine 100 moves from the intermediate location 210 to the second location (i.e., the other one of the digging location 202 or the unloading location 204) in forward/drive mode. In another embodiment, the controller 302 may be configured to determine a total number of wheel revolutions completed by the wheels 110, 112 during the entire combination of the travelling operations (indicated by the arrows A+B+C+D in FIG. 2) performed from the digging location 202, to the unloading location 204 and then back to the digging location 202.

Figure 4:
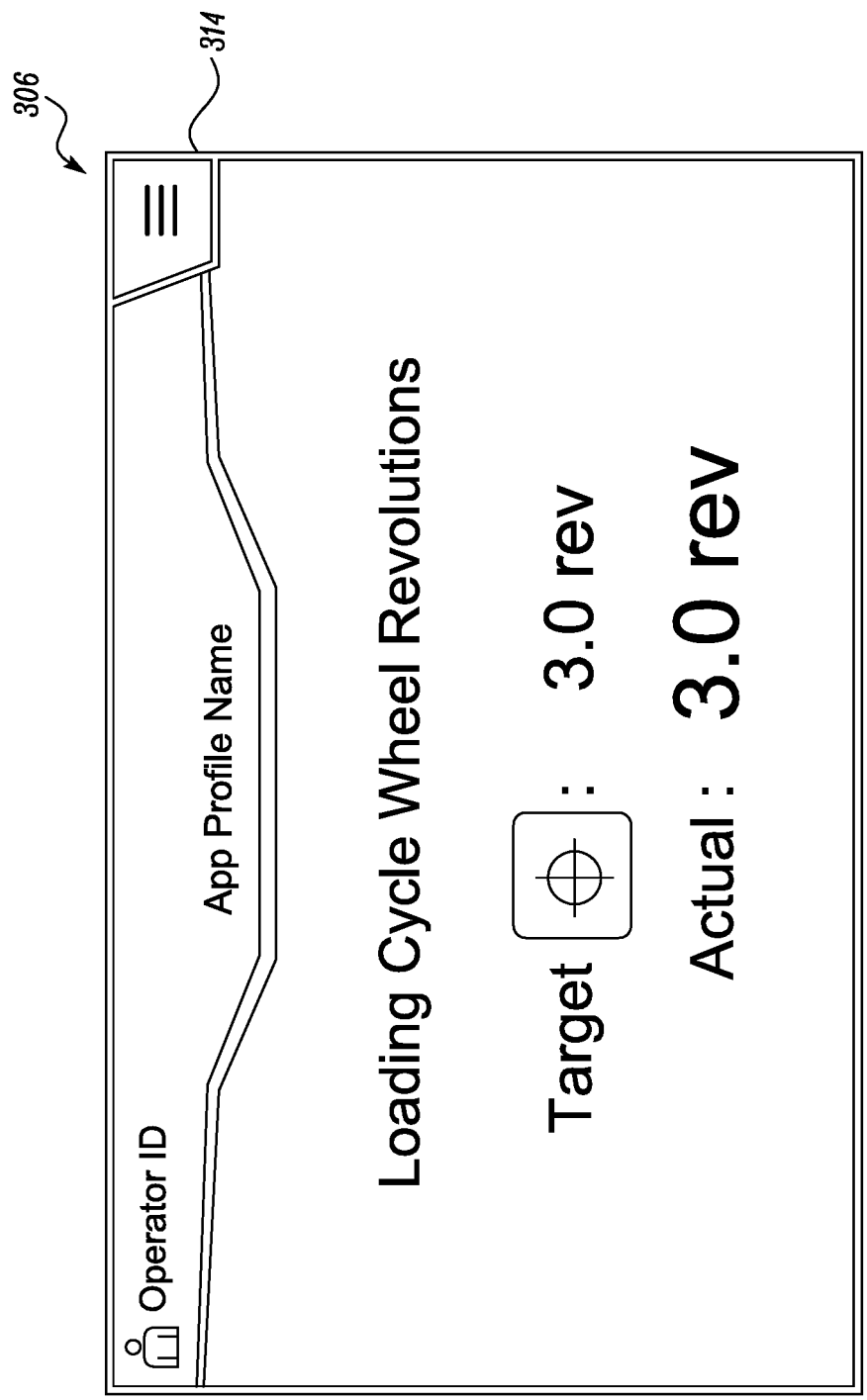
FIG. 4 illustrates the exemplary display device for displaying a number of revolutions completed by a set of ground engaging member of the machine between the first location and the second location, according to the embodiments of the present disclosure.

Further, in an embodiment of the present disclosure, the controller 302 is configured to display the determined number of wheel revolutions on the display device 314 (as shown in FIG. 4) associated with the machine 100. In one example, the controller 302 may be configured to display the total number of revolutions completed by the wheels 110, 112 between the first location (i.e., the digging location 202) and the second location (i.e., the unloading location 204), as shown by directions A+B in FIG. 2. In some other implementations, the controller 302 may display the first number of revolutions and the second number of revolutions separately on the display device 314. In a yet another embodiment, the controller 302 may be configured to display the number of wheel revolutions completed by the wheels 110, 112 during the entire combination of the travelling operations (indicated by the arrows A+B+C+D in FIG. 2) performed between the digging location 202, the unloading location 204 and then back to the digging location 202. The controller 302 may be further configured to reset the counter for the number of revolutions completed by the ground engaging members 106 once a new first implement operation (i.e., a new digging operation) is detected and repeats the determination and display of number of wheel revolutions for every travelling operation performed by the machine 100.

In an exemplary implementation, the controller 302 may be configured to receive a predefined target distance, such as in form of target number of revolutions required to be completed by the wheels 110, 112 between the first location and the second location. The predefined target number of revolutions may correspond to the optimum distance at which the truck 208 is required to be positioned so that the machine 100 is able to repeat the loading operation and the unloading operation efficiently. In one implementation, the controller 302 may extract the predefined target distance as well as the predefined target number of revolutions from the database. In another implementation, the controller 302 may receive the predefined target number of revolutions from the operator of the machine 100 via the input devices 316. It may be further contemplated that the controller 302 may receive either a total target or separate individual target number of revolutions to be completed by the wheels 110, 112 between the first location 202—intermediate location 210 (shown by arrows A or D); the intermediate location 210—second location 204 (shown by arrows B or C); or the entire combination of travel from first location 202—intermediate location 210—second location 204—intermediate location 210—first location 202 (as shown by the arrows A+B+C+D in FIG. 2). In an exemplary implementation, the predefined target number of revolutions for the travelling operation (i.e., from the digging location 202 to intermediate location 210 and further to the unloading location 204) may be set as 3 wheel revolutions. In another example, the controller 302 may receive a first target of 1.5 revolutions for movement of the machine 100 from the digging location 202 to intermediate location 210 and another target of 1.5 revolutions from intermediate location 210 to the unloading location 204.

The controller 302 is further configured to display the target number of revolutions also on the display device 314, as shown in FIG. 4, along with the determined actual number of revolutions completed by the wheels 110, 112. Additionally, or alternatively, the controller 302 is configured to compare the actual determined number of revolutions completed by the wheels 110, 112 with the corresponding predefined target number of revolutions and generate an alert for the operator if the actual number exceeds the predefined target. For example, the controller 302 may generate the alert via the I/O devices 306, such as on the display device 314 to indicate to the operator that the machine 100 has moved more than the predefined target number of revolutions, thereby indicating that the truck 208 may be parked at a sub-optimal distance and may be moved closer for efficient operations.

Although the present disclosure is described in terms of wheel revolutions, it may be contemplated that the number of wheel revolutions is merely an exemplary form of providing the actual distance travelled vs. target distance information to the operator and that such information may be provided in any other form such as in meters, miles, etc., or in terms of machine lengths, in a similar manner.

INDUSTRIAL APPLICABILITY

Figure 5:
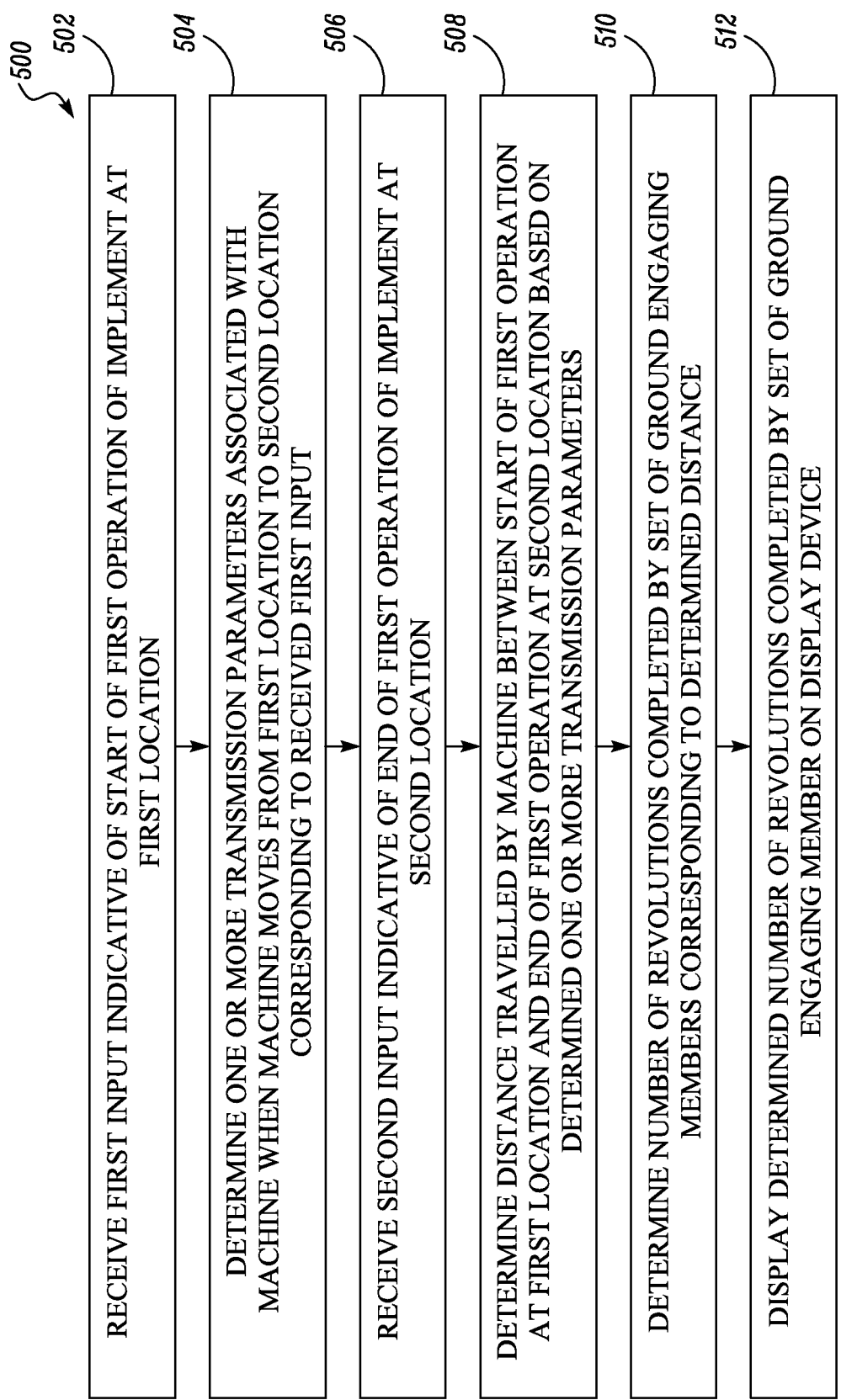
FIG. 5 illustrates an exemplary for monitoring the machine operating at the worksite, according to the embodiments of the present disclosure.

FIG. 5 illustrates an exemplary method 500 for monitoring the machine 100 operating at the worksite 102 between a first location (such as the digging location 202) and a second location (such as the unloading location 204). Initially, at step 502, a first input is received, indicating start of a travelling operation of the machine 100 after completion of a first implement operation of the implement 118 at the first location, such as the digging location 202. For example, the controller 302 receives the first input from either the operator via the I/O devices 306 or from the implement sensors 308 or both. In one example, the first input may indicate that the travelling operation of the machine 100 is started after the digging operation of the implement 118 is complete at the digging location 202. In another example, the first input may indicate that the travelling operation is started after the unloading operation of the implement 118 is complete at the unloading location 204.

At step 504, one or more transmission parameters are determined when the machine 100 moves from the first location towards the second location corresponding to the received first input at step 502. In an exemplary implementation, the one or more transmission parameters include a first transmission parameter and a second transmission parameter. The first transmission parameter is received from the machine speed sensor 310 and configured to indicate machine speed at which the machine 100 is travelling. The second transmission parameter is received from the transmission sensor 312 and configured to indicate the transmission gear selection or transmission mode (drive, neutral, reverse, park, etc.) in which the machine 100 is operating.

Further, at step 506, a second input indicating end of the travelling operation at start of a second implement operation of the implement 118 the second location, is received. For example, the controller 302 receives the second input from either the operator via the I/O devices 306 or from the implement sensors 308 or both. In one example, the second input may indicate that the unloading cycle is started and the travelling operation has ended at the unloading location 204. In another example, the second input may indicate that the travelling operation has ended after the digging operation is started at the digging location 202.

Further, at step 508, a distance $D_T$ travelled by the machine 100 between the start of the travelling operation at the first location and the end of the travelling operation at the second location, is determined. For example, the controller 302 may be configured to determine the distance $D_T$ travelled by the machine 100 based on the determined machine speed and the transmission gear. Further, a total of a first distance D1 and a second distance D2 may be determined as the distance $D_T$ travelled by the machine 100 between the first location and the second location via the intermediate location 210. The first distance D1 may correspond to the distance travelled by the machine 100 between the first location (i.e., one of the digging location 202 or the unloading location 204) and the intermediate location 210, when the machine speed indicates speed less than zero and the transmission gear selection is determined to be reverse transmission gear. Similarly, the second distance D2 may correspond to a distance travelled by the machine 100 between the intermediate location 210 and the second location (i.e., the other one of the digging location 202 or the unloading location 204), when the machine speed indicates speed greater than zero and the transmission gear selection is determined to be drive gear.

At step 510, a number of revolutions completed by the set of ground engaging members 106, i.e., the wheels 110, 112 between the first location and the second location, is determined. For example, the controller 302 is configured to determine a number of revolutions completed by the ground engaging members 106, i.e., the wheels 110, 112 between the first location, such as the digging location 202 and the second location, such as the unloading location 204 and/or vice-versa. In one implementation, the number of revolutions may be determined based on the determined distance $D_T$ travelled by the machine 100 between the first location 202 and the second location 204 and a predefined dimension, such as a diameter or radius or circumference, of the wheels 110, 112 of the machine 100. In an exemplary implementation, a total of a first number of wheel revolutions and a second number of revolutions may be determined as the number of revolutions completed by the wheels 110, 112. The first number of revolutions may correspond to the number of revolutions completed by the wheels 110, 112 when the machine 100 moves from the first location (i.e., one of the digging location 202 or the unloading location 204) to the intermediate location 210, in reverse mode or vice-versa. Similarly, the second number of revolutions may correspond to a number of revolutions completed by the wheels 110, 112 when the machine 100 moves from the intermediate location 210 to the second location 204 (i.e., the other one of the digging location 202 or the unloading location 204) in forward/drive mode or vice-versa. In another embodiment, a total number of revolutions completed by the wheels 110, 112 may be determined for the combination of the travelling operations (indicated by the arrows A+B+C+D in FIG. 2) performed between the digging location 202, the unloading location 204 and then back to the digging location 202.

Further, at step 512, the determined number of revolutions completed by the wheels 110, 112 is displayed on the display device 314 associated with the machine 100. In one example, the total number of revolutions completed by the wheels 110, 112 between the first location (i.e., the digging location 202) and the second location (i.e., the unloading location 204), as shown by directions A+B in FIG. 2. In some other implementations, the first number of revolutions and the second number of revolutions may be displayed separately on the display device 314. In a yet another embodiment, the number of wheel revolutions completed by the wheels 110, 112 during the combination of the travelling operations (indicated by the arrows A+B+C+D in FIG. 2) performed between the digging location 202, the unloading location 204 and then back to the digging location 202 may be displayed on the display device 314. In a further embodiment, the determined number of revolutions completed by the wheels 110, 112 may displayed along with a predefined target number of revolutions. Such display of both the actual as well as the target number of revolutions facilitate the operator in monitoring the distance travelled between the digging location 202 and the unloading location 204, and vice-versa. Thus, the operator can effectively park the truck 208 at an optimum distance from the pile 206 of work material 201 to efficiently perform the operations at the worksite 102.

In operation, once the digging operation is completed at the digging location 202, the display device 314 will display the target number of revolutions as fixed and start the counter of actual number of revolutions completed by the wheels 110, 112 from zero. As the machine 100 starts the travelling operation and travels from the digging location 202 to the intermediate location 210, the actual number of revolutions start incrementing and once the machine 100 finally reaches the unloading location 204 (end of travelling operation), a total number of revolutions completed until the unloading location 204 is displayed on the display device 314. The controller 302 may be configured to reset the counter for the number of revolutions completed by the ground engaging members 106 once the machine 100 reaches back to the digging location 202 and a new digging operation is detected. The operator can monitor the number of revolutions completed by the wheels 110, 112 and ensure that the machine 100 does not move more than the optimum distance, defined in terms of the target number of revolutions, between the first location, i.e., the digging location 202 and the second location, i.e., the unloading location 204. Accordingly, if the actual number of revolutions completed by the wheels 110, 112 exceeds the predefined target number of revolutions, the operator is alerted and the operator may accordingly optimize the movement of the machine 100 and/or change the position of the truck 208 to move closer to the pile 206 such that the actual number of revolutions is equal to the predefined target number of revolutions.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method, to be implemented by a controller, for monitoring a machine operating at a worksite, the machine being configured to be propelled by a set of ground engaging members at the worksite between a loading location and an unloading location and including an implement for performing one or more implement operations at the worksite, the method comprising:
   receiving a first input indicative of start of a travelling operation of the machine after completion of a first implement operation at the loading location;
   determining one or more transmission parameters associated with the machine when the machine moves from the loading location to the unloading location corresponding to the received first input;
   receiving a second input indicative of end of the travelling operation at start of a second implement operation at the unloading location;
   determining a number of revolutions completed by the set of ground engaging members between the start of the travelling operation at the loading location and the end of the travelling operation at the unloading location based on the determined one or more transmission parameters;
   determining, based on the number of revolutions exceeding a predefined target number of revolutions, that a first distance from the loading location to the unloading location exceeds a threshold distance associated with a desired machine efficiency at the worksite;
   causing, based on determining that the first distance exceeds the threshold distance, an alert associated with changing the end of the travelling operation from the unloading location to a different unloading location closer to the loading location,
      wherein a second distance from the loading location to the different unloading location does not exceed the threshold distance; and
   displaying on an input/output device associated with the machine, the determined number of revolutions completed by the set of ground engaging members.

2. The method of claim 1, wherein the first implement operation is a loading operation performed by the implement at the loading location and the second implement operation is an unloading operation performed by the implement at the unloading location.

3. The method of claim 1, wherein determining the number of revolutions includes determining the first distance travelled by the machine between the start of the travelling operation at the loading location and the end of the travelling operation at the unloading location based on the determined one or more transmission parameters.

4. The method of claim 3, wherein the one or more transmission parameters include one or more of a first transmission parameter indicating a machine speed and a second transmission parameter indicative of a transmission gear associated with the machine, and wherein determining the first distance travelled by the machine includes:
   determining, by the controller, a third distance travelled by the machine between the loading location and an intermediate location when the determined first transmission parameter indicates a machine speed less than zero and the second transmission parameter indicates a reverse transmission gear; and determining, by the controller, a fourth distance travelled by the machine between the intermediate location and the unloading location when the determined first transmission parameter indicates a machine speed greater than zero and the second transmission parameter indicates a forward transmission gear.

5. The method of claim 1, wherein the one or more transmission parameters includes one or more of a first transmission parameter indicating a machine speed and a second transmission parameter indicative of a transmission gear associated with the machine and wherein determining the number of revolutions completed by the set of ground engaging members includes:
  determining, by the controller, a first number of revolutions completed by the set of ground engaging members between the loading location and an intermediate location when the determined first transmission parameter indicates a machine speed less than zero and the second transmission parameter indicates a reverse transmission gear; and
  determining, by the controller, a second number of revolutions completed by the set of ground engaging members between the intermediate location and the unloading location when the determined first transmission parameter indicates a machine speed greater than zero and the second transmission parameter indicates a forward transmission gear.

6. The method of claim 1 further comprising:
  receiving, by the controller, the predefined target number of revolutions to be completed by the set of ground engaging members between the loading location and the unloading location;
  comparing, by the controller, the determined number of revolutions completed by the set of ground engaging members between the loading location and the unloading location with the received predefined target number of revolutions; and
  generating, by the controller, using the input/output device, the alert when the determined number of revolutions completed by the set of ground engaging members is greater than the predefined target number of revolutions.

7. A system for monitoring a machine operating at a worksite, the machine being configured to be propelled by a set of ground engaging members at the worksite between a loading location and an unloading location and including an implement for performing one or more implement operations at the worksite, the system comprising:
  an input/output device for receiving one or more inputs for operating the machine and the implement;
  one or more implement sensors for sensing one or more implement parameters;
  one or more machine sensors for sensing one or more transmission parameters associated with the machine; and
  a controller operatively coupled to the input/output device, the one or more implement sensors, and the one or more machine sensors, the controller being configured to:
    receive, from one or more of the input/output device and the one or more implement sensors, a first input indicative of start of a travelling operation of the machine after completion of a first implement operation at the loading location;
    determine, using the one or more machine sensors, one or more transmission parameters associated with the machine when the machine moves from the loading location to the unloading location corresponding to the received first input;
    receive, from one or more of the input/output device and the one or more implement sensors, a second input indicative of end of the travelling operation at start of a second implement operation at the unloading location;
    determine a number of revolutions completed by the set of ground engaging members between the start of the travelling operation at the loading location and the end of the travelling operation at the unloading location based on the determined one or more transmission parameters;
    determine, based on the number of revolutions exceeding a predefined target number of revolutions, that a first distance from the loading location to the unloading location exceeds a threshold distance associated with a desired machine efficiency at the worksite;
    cause, based on determining that the first distance exceeds the threshold distance, an alert associated with changing the end of the travelling operation from the unloading location to a different unloading location closer to the loading location,
      wherein a second distance from the loading location to the different unloading location does not exceed the threshold distance; and
    display, on the input/output device, the determined number of revolutions completed by the set of ground engaging members.

8. The system of claim 7, wherein the machine is a wheel loader, wherein the loading location is a digging location, and wherein the first operation is a digging operation performed by the implement at the digging location and the second implement operation is an unloading operation performed by the implement at the unloading location.

9. The system of claim 7, wherein the one or more machine sensors include one or more of a machine speed sensor configured to sense a first transmission parameter indicating a machine speed and a transmission sensor configured to sense a second transmission parameter indicative of a transmission gear associated with the machine.

10. The system of claim 9, wherein the controller is further configured to determine the first distance travelled by the machine between the start of the travelling operation at the loading location and the end of the travelling operation at the unloading location based on the determined one or more transmission parameters, and wherein the determined number of revolutions correspond to the determined first distance.

11. The system of claim 10, wherein the controller is configured to:
  determine a third distance travelled by the machine between the loading location and an intermediate location when the determined first transmission parameter indicates a machine speed less than zero and the second transmission parameter indicates a reverse transmission gear; and
  determine a fourth distance travelled by the machine between the intermediate location and the unloading location when the determined first transmission parameter indicates a machine speed greater than zero and the second transmission parameter indicates a forward transmission gear; and
  determine a total of the third distance and the fourth distance as the first distance travelled by the machine between the start of the travelling operation at the loading location and the end of the travelling operation at the unloading location.

12. The system of claim 9, wherein the controller is configured to:
   determine a first number of revolutions completed by the set of ground engaging members between the loading location and an intermediate location when the determined first transmission parameter indicates a machine speed less than zero and the second transmission parameter indicates a reverse transmission gear; and
   determine a second number of revolutions completed by the set of ground engaging members between the intermediate location and the unloading location when the determined first transmission parameter indicates a machine speed greater than zero and the second transmission parameter indicates a forward transmission gear; and
   determine a total of the first number of revolutions and the second number of revolutions as the number of revolutions completed by the set of ground engaging members.

13. The system of claim 7, wherein the controller is further configured to:
   receive the predefined target number of revolutions to be completed by the set of ground engaging members between the loading location and the unloading location;
   compare the determined number of revolutions completed by the set of ground engaging members with the received predefined target number of revolutions; and
   generate the alert, on the input/output device, when the determined number of revolutions completed by the set of ground engaging members is greater than the predefined target number of revolutions.

14. A machine configured to operate at a worksite between a digging location and an unloading location, the machine comprising:
   an implement for performing one or more implement operations at the worksite;
   a set of ground engaging members for propelling the machine between the digging location and the unloading location; and
   a system for monitoring the machine, the system including:
      an input/output device associated with the machine for receiving one or more inputs for operating the machine and the implement;
      one or more implement sensors for sensing one or more implement parameters;
      one or more machine sensors for sensing one or more transmission parameters associated with the machine; and
      a controller operatively coupled to the input/output device, the one or more implement sensors, and the one or more machine sensors, the controller being configured to:
         receive, from one or more of the input/output device and the one or more implement sensors, a first input indicative of start of a travelling operation of the machine after completion of a digging operation of the implement at the digging location;
         determine, using the one or more machine sensors, one or more transmission parameters associated with the machine when the machine moves from the digging location to the unloading location corresponding to the received first input;
         receive, from one or more of the input/output device and the one or more implement sensors, a second input indicative of end of the travelling operation of the machine at start of an unloading operation of the implement at the unloading location;
            wherein the unloading operation includes unloading work material on to a truck parked at the unloading location;
         determine a distance travelled by the machine between the start of the travelling operation at the digging location and the end of the travelling operation at the unloading location based on the determined one or more transmission parameters;
         display, on the input/output device, the determined distance travelled by the machine between the start of the travelling operation at the digging location and the end of the travelling operation at the unloading location; and
         cause, based on the determined distance travelled by the machine exceeding a threshold distance associated with a desired machine efficiency at the worksite, an alert associated with moving the truck to a different unloading location closer to the digging location,
            wherein, after the truck is moved, a different distance travelled by the machine, corresponding to the different unloading location, does not exceed the threshold distance.

15. The machine of claim 14, wherein the alert is displayed on the input/output device.

16. The machine of claim 14, wherein the controller is further configured to:
   determine a number of revolutions completed by the set of ground engaging members corresponding to the determined distance; and
   display, on the input/output device, the determined number of revolutions.

17. The machine of claim 14, wherein the controller is further configured to:
   receive a predefined target number of revolutions to be completed by the set of ground engaging members between the digging location and the unloading location;
   compare a determined number of revolutions completed by the set of ground engaging members with the received predefined target number of revolutions; and
   generate the alert, on the input/output device, when the determined number of revolutions completed by the set of ground engaging members is greater than the predefined target number of revolutions.

18. The machine of claim 14, wherein the one or more machine sensors include one or more of a machine speed sensor configured to sense a first transmission parameter indicating a machine speed and a transmission sensor configured to sense a second transmission parameter indicative of a transmission gear associated with the machine.

19. The machine of claim 18, wherein the controller is configured to:
   determine a first distance travelled by the machine between the digging location and an intermediate location when the determined first transmission parameter indicates a machine speed less than zero and the second transmission parameter indicates a reverse transmission gear; and
   determine a second distance travelled by the machine between the intermediate location and the unloading location when the determined first transmission parameter indicates a machine speed greater than zero and the second transmission parameter indicates a forward transmission gear; and determine a total of the first distance and the second distance as the distance travelled by the machine between the start of the travelling operation at the digging location and the end of the travelling operation at the unloading location.

20. The machine of claim 19, wherein the controller is configured to:

determine a first number of revolutions completed by the set of ground engaging members corresponding to the first distance travelled by the machine between the digging location and the intermediate location; and determine a second number of revolutions completed by the set of ground engaging members corresponding to the second distance travelled by the machine between the intermediate location and the unloading location; and display a total of the first number of revolutions and the second number of revolutions completed by the set of ground engaging members.

\* \* \* \* \*